Oct. 9, 1928.  1,686,565
J. H. KNAPP
CALCINING FURNACE
Filed Dec. 17, 1924   3 Sheets-Sheet 1

INVENTOR
James H. Knapp

Oct. 9, 1928.
J. H. KNAPP
CALCINING FURNACE
Filed Dec. 17, 1924    3 Sheets-Sheet 2
1,686,565
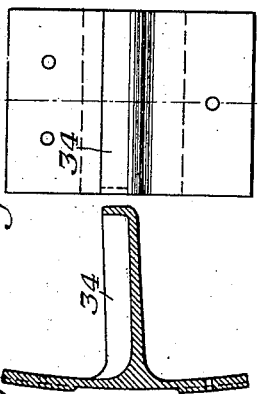
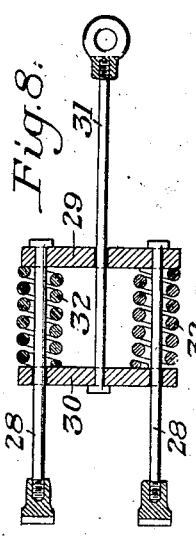
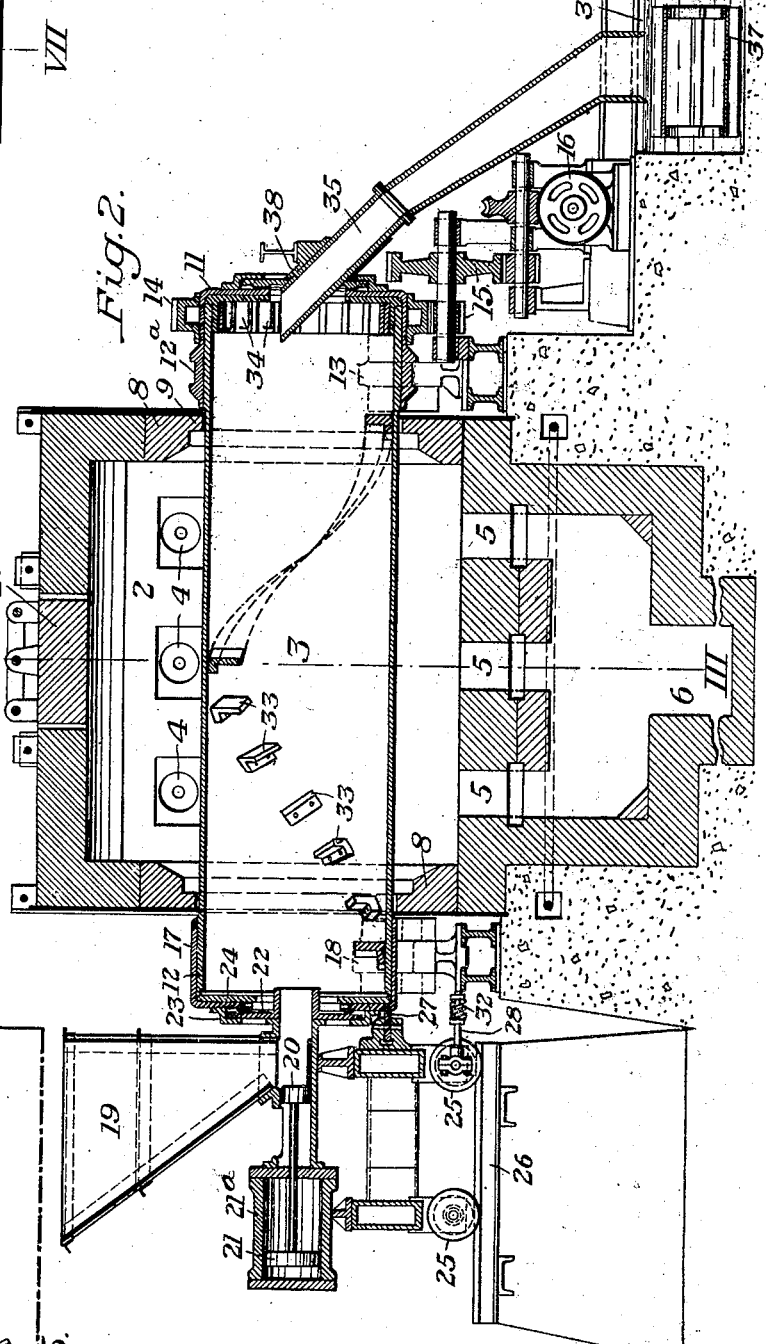
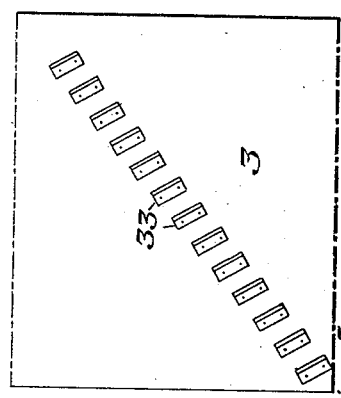
INVENTOR Oct. 9, 1928.
J. H. KNAPP
1,686,565
CALCINING FURNACE
Filed Dec. 17, 1924   3 Sheets-Sheet 3
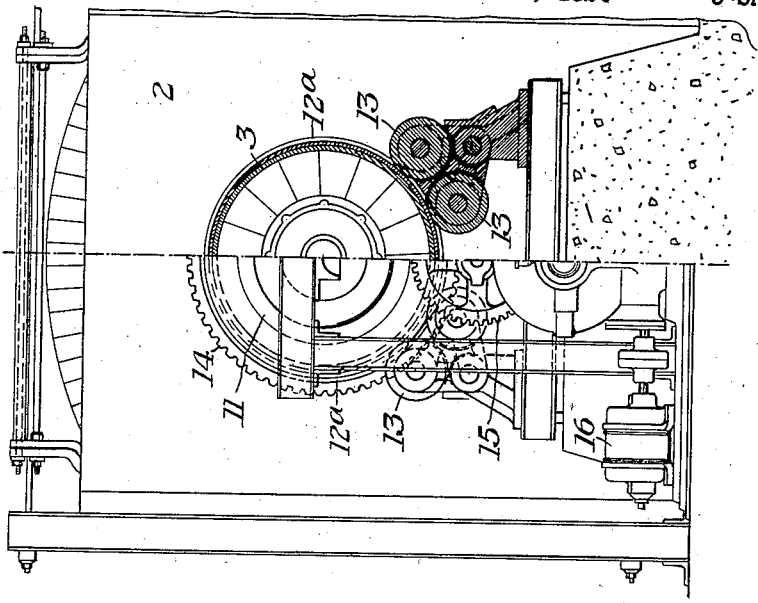
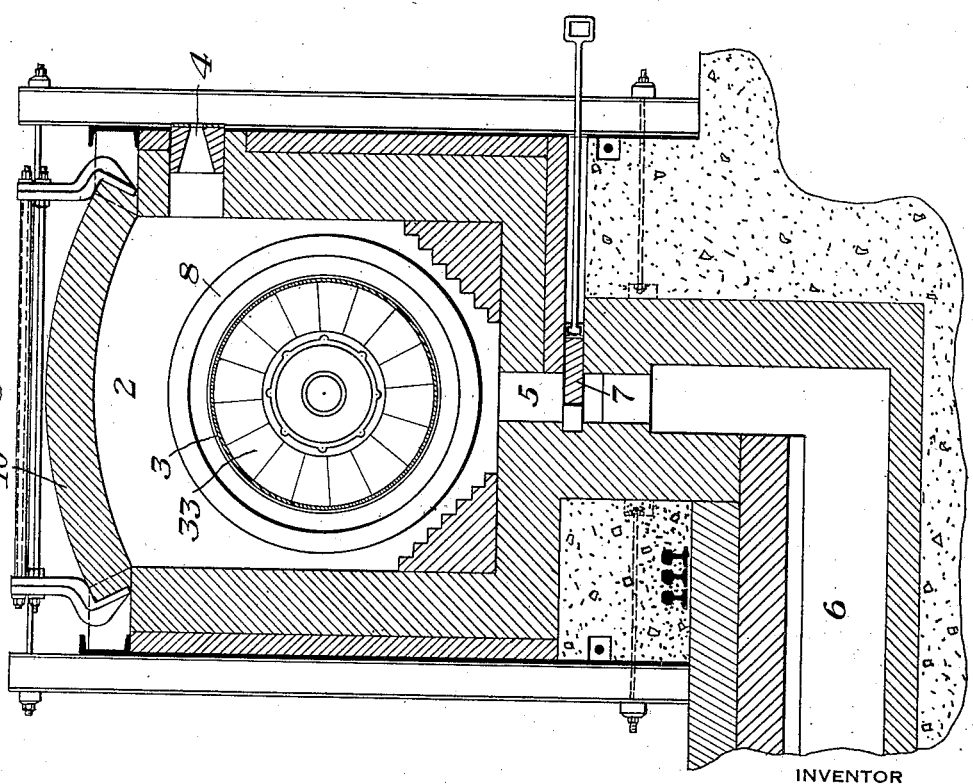
INVENTOR
James H. Knapp
By Byrnes, Stebbins & Parmelee
His Attys Patented Oct. 9, 1928.

1,686,565

UNITED STATES PATENT OFFICE.

JAMES H. KNAPP, OF LOS ANGELES, CALIFORNIA, ASSIGNOR TO TATE JONES & COMPANY, INCORPORATED, OF PITTSBURGH, PENNSYLVANIA, A CORPORATION OF PENNSYLVANIA.

CALCINING FURNACE.

Application filed December 17, 1924. Serial No. 756,430.

This invention relates to a calcining furnace and is particularly applicable for the manufacture of lithopone. In the manufacture of lithopone a precipitate formed of barium sulphate and zinc sulphide is exposed to heat to calcine the product which is then quenched in cold water and dried. During the calcining operation two reactions take place the first of which causes the material to turn black and the second of which causes the black product to turn white or into the finished lithopone.

It is therefore desirable that the material be passed through the calcining chamber in a continuous manner since it is insured thereby that all the material will be uniformly treated and a uniform product will result.

During the calcining operation the material is preferably heated out of contact with the atmosphere and discharged into a quenching bath without coming into contact with the atmosphere.

To accomplish these objects I provide a calcining furnace having a heating chamber and a calcining chamber therein adapted to receive material at one end and to discharge a calcined product at the other. In its passage through the calcining chamber the material is suitably agitated to insure uniform heating and on discharge is passed to a quenching bath where it is cooled and then taken away.

In order to secure suitable agitation the calcining chamber preferably takes the form of a rotatable drum, the ends of which project outside the heating chamber. Suitable material handling connections are made to these projecting ends and supporting and rotating means are also provided therefor. In this manner all operating parts lie outside of the heating chamber and are not subject to its effects while the larger portion of the drum lies within the heating chamber for securing the desired heat therefrom.

I further provide a movable material handling means whereby free expansion and contraction of the calcining chamber may occur without disturbing the function of the material handling apparatus connected therewith. I further provide for regulating the heat supplied to different portions of the calcining chamber or drum whereby the process may be more closely regulated.

In the accompanying drawings illustrating the present preferred embodiment of my invention, Figure 1 is a top plan view, partly broken away, of a calcining furnace embodying my invention;

Figure 2 is a vertical section on the line II—II of Figure 1;

Figure 3 is a vertical section on the line III—III of Figure 2;

Figure 4 is an end view, half in elevation and half in section, of the furnace;

Figure 5 is a developed view of the drum;

Figure 6 is an elevation of a discharge bucket;

Figure 7 is a section on the line VII—VII of Figure 6, and

Figure 8 is a horizontal detailed section of a portion of the apparatus.

Figure 1:
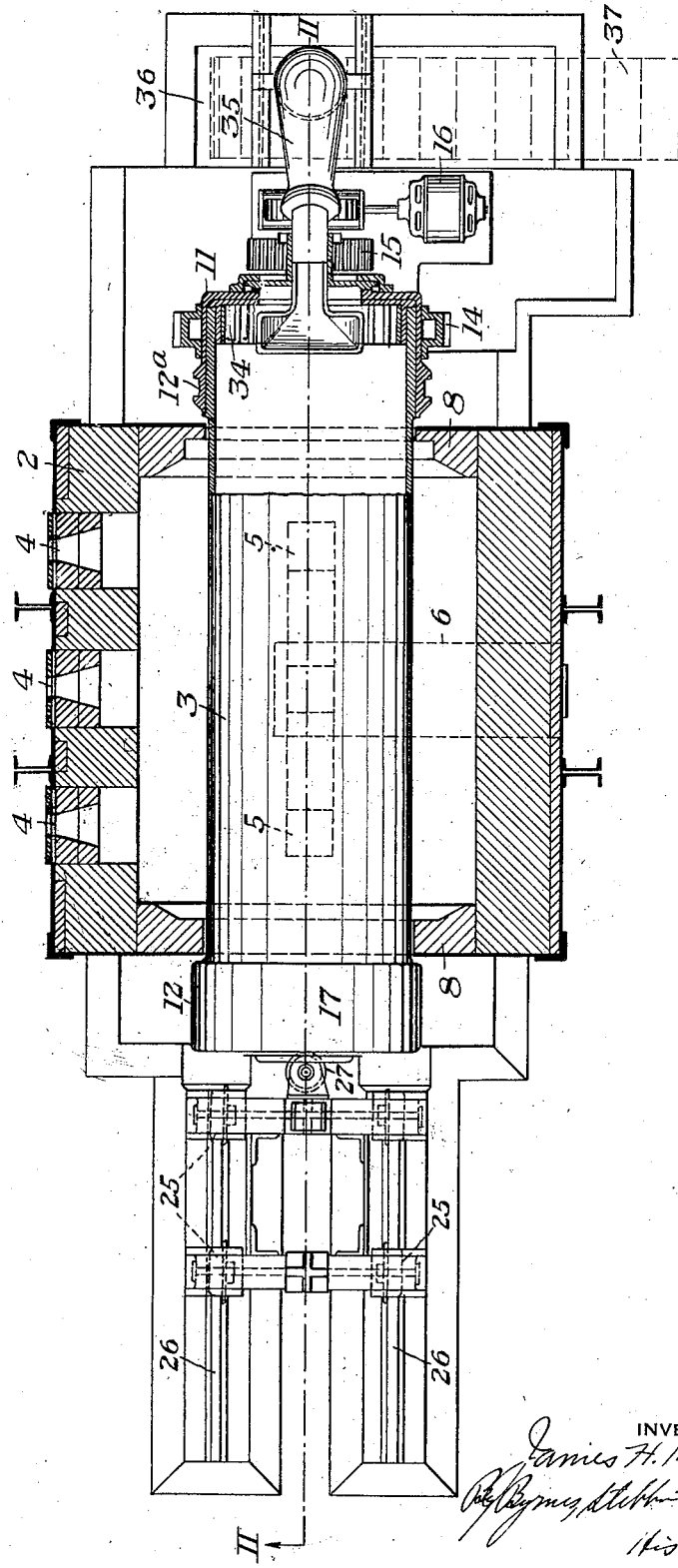

In the illustrated embodiment of my invention there is shown a heating furnace 2 surrounding a rotatable calcining drum 3. Heat is supplied through burner openings 4 and the products of combustion pass around the drum 3 through a plurality of flue openings 5 to a stack connection 6. Each of the flue openings 5 is preferably provided with a damper 7 whereby their relative opening may be varied, thus regulating the amount of heat supplied the different portions of the drum or calcining chamber 3.

Special blocks 8 are provided for the walls of the chamber 2 immediately adjacent the drum 3. These blocks have relatively thin portions 9 which fit closely around the drum 3 to minimize the loss of heat between the rotating drum and the chamber wall. The blocks are thinned down at this point to provide a maximum possible heating surface for the drum 3. A removable section 10 is preferably provided in the roof of the heating chamber to permit ready access to the interior thereof.

The drum 3 is provided with end portions 11 and 12 which project outside the heating chamber 2. The end 11 is provided with a flanged track 12$^a$ engaging supporting rollers 13 and is further provided with a ring gear 14 connected by suitable gears 15 to a driving motor 16 for rotating the drum 3.

The end 12 is provided with a relatively wide bearing portion 17 and supporting rollers 18, thus permitting free expansion of the drum 3. In order to prevent corrosion the drum is preferably made of any suitable heat resisting alloy metal such as nichrome or thermalloy. Unalloyed metals are unsatisfactory because they scale at high temperatures. These metal drums tend to expand considerably when heated, the expansion of the drum in a full sized furnace being sometimes as great as three-quarters of an inch. By the above described mounting the end 11 of the drum is maintained relatively stationary and the other end is free to expand.

The material to be calcined is supplied to the drum from a hopper 19 by means of a feeding ram 20. The ram is operatively connected with a fluid actuating piston 21 which may be connected with any suitable pressure source (not shown) to cause reciprocation of the ram 20. The feeding ram is substantially co-axial with the drum and is connected to a circular plate 22. This plate lies between the end of the drum and an annular ring 23 and the ends are suitably machined at 24 for making the joint as nearly air-tight as possible.

As above mentioned, the drum expands and contracts considerably in operation, and I therefore mount the feeding apparatus on wheels 25 running on a track 26 so that the feeding mechanism may move back and forth as the drum expands and contracts. In order to properly preserve the joint between the feeding mechanism and the drum I provide a roller 27 which bears against the end of the drum and limits the movement of the plate 23 toward the same. In order to always hold this wheel against the end of the drum I provide a pair of rods 28 which are secured to the feeder mechanism and are connected at one end by a yoke 29. A yoke 30 is slidably mounted on the rods 28 and is connected to the framework of the apparatus by a rod 31. Springs 32 tend to spread the yokes 29 and 30 apart and thus urge the feeder mechanism against the drum at all times.

The admission of fluid to the cylinder 21ª in which the piston 21 operates is controlled to supply raw materials to the drum 3 in suitable amounts. As the drum rotates vanes 33 tend to advance the material toward the end 11. During such rotation the material is turned over and over and is thus exposed in all portions to the heated walls of the chamber 3. As the material moves through the drum the two reactions follow one another and without the material which has passed through any one reaction being ever mixed with material which has not yet so far advanced in the treatment. In this manner uniformity of operation and product is insured.

When the material reaches the end 11 of the drum it is picked up by buckets 34 and lifted to the upper portion of the drum. As the rotation of the drum continues this material is dropped out of the buckets into a discharge spout 35 through which the calcined material slides into a quenching bath 36. The discharge spout is preferably flared outwardly toward the bottom as this prevents clogging of the material therein. From the quenching bath 36 the material may be taken away in any desired manner, as by a chain bucket conveyor 37. An opening 38 is provided in the discharge spout through which a thermometer or pyrometer may be inserted.

It will be noted that the discharge spout is stationary and is suitably packed in the same manner as the feeder mechanism. However, it is unnecessary to provide for moving the discharge apparatus since the end 11 of the drum is mounted stationary by the flanges on the track 12ª. It will be understood that either of the material handling means, that is, the feeder or the discharge apparatus, may be mounted on the stationary end of the drum and the other made movable but it is preferred to mount the two material handling means as illustrated.

I thus provide a calcining furnace wherein the material is supplied to one end of a calcining chamber, advanced therethrough in a substantially continuous manner and discharged therefrom in a substantially continuous manner. It is therefore possible to carry on processes such as the calcining of lithopone without danger of untreated material being mixed with treated material and thus escaping the complete calcining operation.

Further provision is made for mounting the calcining drum in such manner that the working parts are not exposed to the heat and at the same time supplying heat to the major portion of the calcining drum. Heat regulating means are provided for regulating the amount of heat supplied to different portions of the drum so that the process may be more closely controlled than is otherwise possible.

I further provide for supplying materials to the calcining chamber and ejecting them therefrom without such materials coming into contact with the outside air and also secure an efficient and long lived apparatus by taking care of the expansion of the calcining drum in the manner above described.

While I have illustrated the preferred embodiment of my invention it will be understood that it is not limited to the form shown but may be otherwise embodied within the scope of the following claims.

I claim:

1. A calcining furnace, including a rotatable calcining drum, means for heating the same, material handling means separate from the drum but adjacent one end of the drum and substantially co-axial therewith, a packing between the material handling means and the drum, and means for maintaining a substantially uniform pressure on the packing regardless of expansion or contraction of the drum, substantially as described.

2. A calcining furnace, including a calcining chamber, material handling means adjacent thereto, means urging the material handling means toward the chamber, and anti-friction means spacing the material handling means from the chamber, substantially as described.

3. A calcining furnace, including a rotatable calcining drum, non-rotatable material handling means at each end thereof, means for maintaining one end of the drum substantially stationary in an axial direction, a packing and means for maintaining a substantially uniform pressure on the packing between the remote end of the drum and the material handling means thereat, said last mentioned material handling means being separate from the drum, substantially as described.

4. A calcining furnace, including a calcining chamber, material handling means adjacent thereto but separate therefrom, means urging the material handling means toward the chamber, and anti-friction means interposed between the material handling means and the chamber for maintaining them a desired distance apart, substantially as described.

5. A calcining furnace, comprising a rotatable calcining chamber, non-rotatable material handling means therefor, means urging the material handling means toward the chamber, and a roller bearing against the chamber and limiting the movement of the material handling means toward the same, substantially as described.

6. A calcining furnace, comprising a rotatable calcining chamber, non-rotatable material handling means therefor, spring means urging the material handling means toward the chamber, and means connected to the material handling means and bearing against the chamber for limiting the movement of the material handling means toward the same, substantially as described.

7. A calcining furnace, including a rotatable drum having an opening in one end thereof, a circular plate stationarily supported to cover the opening, the plate having an aperture therethrough centrally thereof, material handling means separate from the drum and cooperating with the aperture, and an annular ring secured to the end of the drum surrounding the periphery of the circular plate, substantially as described.

8. A calcining furnace, including a rotatable drum having an opening in one end thereof, a circular plate stationarily supported to cover the opening, the plate having an aperture therethrough centrally thereof, material feeding means cooperating with the aperture, material handling means separate from the drum and cooperating with the material feeding means, and means for sealing the joint between the drum and plate, substantially as described.

In testimony whereof I have hereunto set my hand.

JAMES H. KNAPP.